United States Patent
Serrao et al.

(10) Patent No.: US 10,215,276 B2
(45) Date of Patent: Feb. 26, 2019

(54) SERIES PARALLEL HYDRAULIC HYBRID ARCHITECTURE

(71) Applicant: DANA ITALIA SPA, Arco (TN) (IT)

(72) Inventors: Lorenzo Serrao, Nago-Torbole (IT); Giulio Ornella, Arco (IT); Ettore Cosoli, Padua (IT)

(73) Assignee: Dana Italia SPA, Arco (IT)

( * ) Notice: Subject to any disclaimer, the term of this patent is extended or adjusted under 35 U.S.C. 154(b) by 255 days.

(21) Appl. No.: 14/999,974

(22) PCT Filed: Feb. 3, 2015

(86) PCT No.: PCT/EP2015/052215
§ 371 (c)(1),
(2) Date: Jul. 21, 2016

(87) PCT Pub. No.: WO2015/117964
PCT Pub. Date: Aug. 13, 2015

(65) Prior Publication Data
US 2016/0341309 A1    Nov. 24, 2016

Related U.S. Application Data

(60) Provisional application No. 61/935,642, filed on Feb. 4, 2014.

(51) Int. Cl.
*F16H 47/02* (2006.01)
*F16H 61/452* (2010.01)
(Continued)

(52) U.S. Cl.
CPC ............. *F16H 61/452* (2013.01); *B60K 6/12* (2013.01); *F16H 47/02* (2013.01);
(Continued)

(58) Field of Classification Search
CPC .... F16H 61/452; F16H 47/02; F16H 61/4096; F16H 2047/025; F16H 2047/045
(Continued)

(56) References Cited

U.S. PATENT DOCUMENTS 4,760,697 A    8/1988  Heggie et al.
4,815,334 A    3/1989  Lexen
(Continued)

FOREIGN PATENT DOCUMENTS

CN         1394273 A      1/2003
CN       201176978 Y      1/2009
(Continued)

OTHER PUBLICATIONS

The State Intellectual Property Office of the People's Republic of China; Office Action issued in the parallel Chinese application No. CN201580006877.4; dated Apr. 21, 2017; 15 pages; The State Intellectual Property Office of the People's Republic of China, Beijing, Republic of China.

(Continued)

*Primary Examiner* — Ha Dinh Ho
(74) *Attorney, Agent, or Firm* — Marshall & Melhorn, LLC (57) ABSTRACT

The invention relates to a dual motor hydraulic hybrid transmission. The transmission comprises a power source, a hydraulic circuit including a pump drivingly engaged with the power source and two displacement units, a hydraulic accumulator assembly including high and low pressure accumulators, one or more control valves, and an output shaft drivingly engaged with the first hydraulic displacement unit. The displacement units are in fluid communication with the hydraulic pump. The accumulators are in fluid communication with the hydraulic circuit. The second hydraulic displacement unit is drivingly engaged with the output shaft.

(Continued)

The control valves are configured to selectively fluidly connect the hydraulic pump to the first hydraulic displacement unit while fluidly disconnecting the hydraulic pump from the second hydraulic displacement unit; and, simultaneously, fluidly connect the hydraulic accumulator assembly to the second hydraulic displacement unit while fluidly disconnecting the hydraulic accumulator assembly from first hydraulic displacement unit.

12 Claims, 5 Drawing Sheets

(51) Int. Cl.
*F16H 61/4096* (2010.01)
*B60K 6/12* (2006.01)
*F16H 47/04* (2006.01)

(52) U.S. Cl.
CPC ... *F16H 61/4096* (2013.01); *F16H 2047/025* (2013.01); *F16H 2047/045* (2013.01)

(58) Field of Classification Search
USPC ........................................................ 74/720
See application file for complete search history.

(56) References Cited

U.S. PATENT DOCUMENTS

| | | | |
|---|---|---|---|
| 5,518,461 A | 5/1996 | Pfordt | |
| 5,579,640 A | 12/1996 | Gray, Jr. et al. | |
| 5,887,674 A | 3/1999 | Gray, Jr. | |
| 6,622,484 B2 | 9/2003 | Hopkins | |
| 6,719,080 B1 | 4/2004 | Gray, Jr. | |
| 7,669,414 B2 | 3/2010 | Loeffler | |
| 7,870,727 B2* | 1/2011 | Mueller | B60K 6/12 180/165 |
| 7,926,265 B2 | 4/2011 | Mueller et al. | |
| 7,934,779 B2* | 5/2011 | Kodama | B60K 6/44 303/151 |
| 7,984,783 B2 | 7/2011 | Gray, Jr. et al. | |
| 8,108,111 B2* | 1/2012 | Stein | B60K 6/12 180/367 |
| 8,162,094 B2 | 4/2012 | Gray, Jr. et al. | |
| 8,616,323 B1 | 12/2013 | Gurin | |
| 8,959,905 B2 | 2/2015 | Baltes et al. | |
| 8,991,167 B2 | 3/2015 | Yuan et al. | |
| 9,032,723 B2 | 5/2015 | Haugen | |
| 9,057,389 B2 | 6/2015 | Opdenbosch | |
| 9,096,115 B2 | 8/2015 | Ho | |
| 9,765,502 B2 | 9/2017 | Heybroek | |
| 9,802,469 B2 | 10/2017 | Ornella | |
| 2004/0251067 A1 | 12/2004 | Gray, Jr. et al. | |
| 2006/0243515 A1 | 11/2006 | Okada et al. | |
| 2009/0165451 A1 | 7/2009 | Mueller | |
| 2011/0232418 A1 | 9/2011 | Gray, Jr. et al. | |
| 2011/0314801 A1 | 12/2011 | Baltes et al. | |
| 2012/0090308 A1* | 4/2012 | Yuan | B29C 45/82 60/327 |
| 2012/0178570 A1 | 7/2012 | Gray, Jr. et al. | |
| 2012/0233991 A1 | 9/2012 | Ivantysynova et al. | |
| 2012/0240564 A1* | 9/2012 | Wesolowski | B60K 6/12 60/327 |
| 2013/0081385 A1* | 4/2013 | Opdenbosch | E02F 9/2217 60/327 |
| 2013/0133318 A1 | 5/2013 | Vogl et al. | |
| 2015/0113969 A1* | 4/2015 | Kochhan | B60K 6/12 60/327 |
| 2016/0059694 A1 | 3/2016 | Heren | |
| 2016/0341309 A1 | 11/2016 | Serrao | |
| 2016/0361986 A1 | 12/2016 | Ornella | |
| 2017/0015197 A1 | 1/2017 | Lambey | |
| 2017/0067489 A1 | 3/2017 | Versteyhe | |
| 2017/0072778 A1 | 3/2017 | Ornella | |
| 2017/0305267 A1 | 10/2017 | Ornella | |
| 2017/0335867 A1 | 11/2017 | Meehan | |

FOREIGN PATENT DOCUMENTS

| | | |
|---|---|---|
| CN | 102518169 A | 6/2012 |
| CN | 102734237 A | 10/2012 |
| DE | 19931208 A1 | 1/2001 |
| DE | 102006017581 A1 | 9/2007 |
| DE | 102006060014 B4 | 5/2009 |
| DE | 102009056153 A1 | 6/2011 |
| DE | 102011005356 A1 | 9/2012 |
| DE | 102011055178 A1 | 5/2013 |
| EP | 0615077 A1 | 9/1994 |
| EP | 1963686 B1 | 10/2011 |
| FR | 2971741 A1 | 8/2012 |
| WO | 9634213 A1 | 10/1996 |
| WO | 9713650 A1 | 4/1997 |
| WO | 0151870 A1 | 7/2001 |
| WO | 2007035997 A1 | 4/2007 |
| WO | 2008012558 A2 | 1/2008 |
| WO | 2010072299 A1 | 7/2010 |
| WO | 2011112663 A2 | 9/2011 |
| WO | 2012125798 A1 | 9/2012 |
| WO | 2013121126 A1 | 8/2013 |
| WO | 2013159851 A1 | 10/2013 |

OTHER PUBLICATIONS

European Patent Office, International Search Report and Written Opinion in PCT/EP2015/052215; dated Apr. 14, 2015, 8 pages, European Patent Office, Rijswijk, The Netherlands.

Chinese Office Action isssued by the Chinese State Intellectual Property Office dated Sep. 20, 2017.

* cited by examiner

SERIES PARALLEL HYDRAULIC HYBRID ARCHITECTURE

BACKGROUND OF THE INVENTION

The present invention relates to a hydraulic hybrid transmission, the transmission comprising a hydraulic circuit including a hydraulic pump and two hydraulic displacement units in fluid communication with the hydraulic pump, and further comprising a hydraulic accumulator assembly in fluid communication with the hydraulic circuit. Hydraulic hybrid transmission systems of this sort may find application in off-highway working machines used in agriculture, mining or construction, such as tractors, wheel loaders, wheeled excavators, backhoe loaders, telehandlers, dumpers, or the like.

The present application claims priority from U.S. Provisional Patent Application No. 61/935,642 filed on Feb. 4, 2014, which is hereby incorporated by reference in its entirety.

All hybrid powertrain systems reduce fuel consumption by recuperating kinetic energy and by enabling engine power buffering (for example, through optimal management of a powertrain operating point). For example, a series hydraulic hybrid arrangement as known is characterized by a pressure coupling of an accumulator and main lines, which means that boosting and regeneration are possible only when the accumulator pressure is consistent with the powertrain operating conditions (external load and speed).

SUMMARY OF THE INVENTION

It is therefore an object of the present invention to design a hydraulic hybrid architecture with improved flexibility in regard to the connection of the accumulators to the hydraulic machines.

This object is solved by the dual motor hydraulic hybrid transmission of claim 1. Special embodiments are described in the independent claims.

Thus, a dual motor hydraulic hybrid transmission is proposed, comprising:
a power source;
a hydraulic circuit comprising:
  a hydraulic pump drivingly engaged or selectively drivingly engaged with the power source;
  a first hydraulic displacement unit in fluid communication with the hydraulic pump; and
  a second hydraulic displacement unit in fluid communication with the hydraulic pump;
a hydraulic accumulator assembly comprising a high pressure accumulator and a low pressure accumulator, the hydraulic accumulator assembly in fluid communication with the hydraulic circuit;
one or more control valves; and
an output shaft;
  wherein the first hydraulic displacement unit is drivingly engaged or selectively drivingly engaged with the output shaft, and wherein the second hydraulic displacement unit is drivingly engaged or selectively drivingly engaged with the output shaft.

The control valves provide fluid communication between the hydraulic pump, the hydraulic displacement units and the accumulator assembly in such a way and are configured such that the control valves can be selectively switched or set to a position or configuration in which they:
  fluidly connect the hydraulic pump to the first hydraulic displacement unit while fluidly disconnecting the hydraulic pump from the second hydraulic displacement unit, and, simultaneously,
  fluidly connect the hydraulic accumulator assembly to the second hydraulic displacement unit while fluidly disconnecting the hydraulic accumulator assembly from first hydraulic displacement unit.

Within the scope of this document the formulation "in fluid communication with" may include at least one of "fluidly connected to" and "selectively fluidly connected to", for example through one or more valves.

The proposed arrangement allows greater freedom in the energy management strategy by enabling the use of accumulator power at any level of pressure (or state of charge). For example, the advantage of the proposed transmission with respect to the known series hybrid architecture is the ability to sum torque at the output shaft at any level of accumulator pressure, thus decoupling the accumulator pressure from the output load.

The power source may be an engine, for example an internal combustion engine or an electric engine. The hydraulic pump may include a hydrostatic pump such as a hydrostatic axial piston pump or a hydrostatic radial piston pump. The hydraulic pump may have a variable hydraulic displacement. For example, the hydraulic pump may have a moveable swashplate or a bent-axis design. The first and/or the second hydraulic displacement unit may include a hydraulic motor, for example a hydrostatic axial piston motor or a hydrostatic radial piston motor. The first and/or the second hydraulic displacement unit may have a variable hydraulic displacement. For example, the first and/or the second hydraulic displacement unit may have a moveable swashplate or a bent-axis design.

The accumulators may be configured as compressed gas accumulators. An accumulator may be pressurized by filling or by partially filling the corresponding accumulator with a hydraulic fluid such as oil, thereby compressing a quantity of gas contained in the accumulator. The gas may be an inert gas such as nitrogen. Similarly, an accumulator may be de-pressurized by letting a compressed gas contained in the accumulator expand, thereby pushing hydraulic fluid contained in the accumulator out of the accumulator and creating a fluid flow. The accumulators may be adapted to operate at hydrostatic pressures up to a maximum operating pressure of at least 300 bar or of at least 400 bar, for example.

The control valves may include one or more shut-off valves and/or one or more directional valves and/or one or more proportional valves, for example. The control valves may be controllable through electromagnetic forces and/or through hydraulic forces. For example, the control valves or some of the control valves may be controllable through one or more pilot valves. The output shaft may be drivingly engaged or selectively drivingly engaged with a vehicle output. The vehicle output may include at least one of a drive shaft, a vehicle axle, a final drive or one or more wheels, for example.

Preferably, the control valves provide fluid communication between the hydraulic circuit and the accumulator assembly in such a way and are configured such that the control valves may selectively fluidly disconnect one or both of the high pressure accumulator and the low pressure accumulator from the hydraulic circuit.

The control valves may additionally provide fluid communication between the hydraulic pump, the hydraulic displacement units and the accumulator assembly in such a way and may be configured such that they can be selectively switched or set to a position or configuration in which they:

fluidly connect the hydraulic pump to the second hydraulic displacement unit while fluidly disconnecting the hydraulic pump from the first hydraulic displacement unit; and, simultaneously, fluidly connect the hydraulic accumulator assembly to the first hydraulic displacement unit while fluidly disconnecting the hydraulic accumulator assembly from second hydraulic displacement unit.

This may further enhance the number of combinations in which the torque/power provided by the power source and the accumulator assembly can be combined at the output shaft, in particular when the first and the second hydraulic displacement unit feature different designs and/or when they differ in their (selective) mechanical coupling to the output shaft. For example, the first and the second hydraulic displacement unit may feature a different (maximum) displacement and/or may be (selectively) mechanically coupled to the output shaft through different gear ratios.

Additionally or alternatively, the control valves may provide fluid communication between the hydraulic pump, the hydraulic displacement units and the accumulator assembly in such a way and may be configured such that the control valves can be selectively switched or set to a position or configuration in which they simultaneously fluidly connect the hydraulic pump to the first hydraulic displacement unit and to the second hydraulic displacement unit.

Normally, the hydraulic pump, the first hydraulic displacement unit and the second hydraulic displacement unit each have a first fluid port and a second fluid port.

The hydraulic pump being fluidly connected to the first hydraulic displacement unit then typically includes the first fluid port of the hydraulic pump being fluidly connected to the first fluid port of the first hydraulic displacement unit and the second fluid port of the hydraulic pump being fluidly connected to the second fluid port of the first hydraulic displacement unit, preferably in a closed-circuit configuration, i. e. sealed from the external environment. For example, a minimum hydraulic pressure in such a closed circuit including the hydraulic pump and the first hydraulic displacement unit may be at least 10 bar or at least 20 bar.

In the same way, the hydraulic pump being fluidly connected to the second hydraulic displacement unit typically includes the first fluid port of the hydraulic pump being fluidly connected to the first fluid port of the second hydraulic displacement unit and the second fluid port of the hydraulic pump being fluidly connected to the second fluid port of the second hydraulic displacement unit, preferably in a closed-circuit configuration, i. e. sealed from the external environment. For example, a minimum hydraulic pressure in such a closed circuit including the hydraulic pump and the second hydraulic displacement unit may be at least 10 bar or at least 20 bar.

The control valves may comprise at least one pump valve, the pump valve providing fluid communication between the hydraulic pump and the hydraulic displacement units and the pump valve having three control positions or control configurations; wherein when the pump valve is set to the first position/configuration, the pump valve fluidly connects the hydraulic pump to the first hydraulic displacement unit and to the second hydraulic displacement unit;

when the pump valve is set to the second position/configuration, the pump valve fluidly connects the hydraulic pump to the first hydraulic displacement unit and fluidly disconnects the hydraulic pump from the second hydraulic displacement unit; and when the pump valve is set to the third position/configuration, the pump valve fluidly connects the hydraulic pump to the second hydraulic displacement unit and fluidly disconnects the hydraulic pump from the first hydraulic displacement unit.

More specifically, the control valves may comprise a first pump valve, the first pump valve providing fluid communication between the first fluid port of the hydraulic pump, the first fluid port of the first hydraulic displacement unit and the first fluid port of the second hydraulic displacement unit, and the first pump valve having three control positions, wherein:

when first pump valve is set to the first control position, the first pump valve fluidly connects the first fluid port of the hydraulic pump to the first fluid port of the first hydraulic displacement unit and to the first fluid port of the second hydraulic displacement unit;

when the first pump valve is set to the second control position, the first pump valve fluidly connects the first fluid port of the hydraulic pump to the first fluid port of the first hydraulic displacement unit and fluidly disconnects the first fluid port of the hydraulic pump from the first fluid port of the second hydraulic displacement unit; and when the first pump valve is set to the third control position, the first pump fluidly connects the first fluid port of the hydraulic pump to the first fluid port of the second hydraulic displacement unit and fluidly disconnects the first fluid port of the hydraulic pump from the first fluid port of the first hydraulic displacement unit.

The control valves may further comprise a second pump valve, the second pump valve providing fluid communication between the second fluid port of the hydraulic pump, the second fluid port of the first hydraulic displacement unit and the second fluid port of the second hydraulic displacement unit, and the second pump valve having three control positions, wherein:

when the second pump valve is set to the first control position, the second pump valve fluidly connects the second fluid port of the hydraulic pump to the second fluid port of the first hydraulic displacement unit and to the second fluid port of the second hydraulic displacement unit;

when the second pump valve is set to the second control position, the second pump valve fluidly connects the second fluid port of the hydraulic pump to the second fluid port of the first hydraulic displacement unit and fluidly disconnects the second fluid port of the hydraulic pump from the second fluid port of the second hydraulic displacement unit; and when the second pump valve is set to the third control position, the second pump valve fluidly connects the second fluid port of the hydraulic pump to the second fluid port of the second hydraulic displacement unit and fluidly disconnects the second fluid port of the hydraulic pump from the second fluid port of the first hydraulic displacement unit.

The first pump valve and the second pump valve are then typically configured such or are controlled such that they are selectively both set to their first control position, both set to their second control position, or both set to their third control position.

The control valves may additionally provide fluid communication between the accumulator assembly and the hydraulic displacement units in such a way and may be configured such that they can be switched or set to a position or configuration in which they simultaneously fluidly connect the hydraulic accumulator assembly to the first hydraulic displacement unit and to the second hydraulic displacement unit.

The control valves may provide fluid communication between the accumulator assembly and the hydraulic displacement units in such a way and may be configured such that fluidly connecting the hydraulic accumulator assembly to one or both of the first hydraulic displacement unit and the second hydraulic displacement unit includes selectively one of:

fluidly connecting the high pressure accumulator to the first fluid port or to the first fluid ports and, simultaneously, fluidly connecting the low pressure accumulator to the second fluid port or to the second fluid ports; and fluidly connecting the high pressure accumulator to the second fluid port or to the second fluid ports and, simultaneously, fluidly connecting the low pressure accumulator to the first fluid port or to the first fluid ports.

The control valves may comprise at least one accumulator valve, the accumulator valve providing fluid communication between the accumulator assembly and the hydraulic displacement units and the accumulator valve having at least three control positions or control configurations, wherein the accumulator valve is configured such that:

when the accumulator valve is set to the first position/configuration, the hydraulic accumulator assembly is fluidly disconnected from the hydraulic circuit;

when the accumulator valve is set to the second position/configuration, the high pressure accumulator is in fluid communication with the first fluid port of at least one of the first and the second hydraulic displacement unit, and the low pressure accumulator is in fluid communication with the corresponding second fluid port or fluid ports of the hydraulic displacement unit or units to which the high pressure accumulator is fluidly connected; and when the accumulator valve is set to the third position/configuration, the high pressure accumulator is in fluid communication with the second fluid port of at least one of the first and the second hydraulic displacement unit and the low pressure accumulator is in fluid communication with the corresponding first fluid port or fluid ports of the hydraulic displacement unit or units to which the high pressure accumulator is fluidly connected.

In particular, the at least one accumulator valve the accumulator valve may be in fluid communication with the hydraulic displacement units through the at least one pump valve.

For example, the accumulator valve may comprise a high pressure accumulator valve, the high pressure accumulator valve providing fluid communication between the high pressure accumulator and the hydraulic displacement units and the high pressure accumulator valve having three control positions, wherein:

when the high pressure accumulator valve is set to the first control position, the high pressure accumulator valve fluidly disconnects the high pressure accumulator from the hydraulic displacement units;

when the high pressure accumulator valve is set to the second control position, the high pressure accumulator valve provides fluid communication between the high pressure accumulator and selectively the first fluid port of at least one of the first and the second hydraulic displacement unit, for example through the first pump valve; and when the high pressure accumulator valve is set to the third control position, the high pressure accumulator valve provides fluid communication between the high pressure accumulator and selectively the second fluid port of at least one of the first and the second hydraulic displacement unit, for example through the second pump valve.

The at least one accumulator valve may further comprise a low pressure accumulator valve, the low pressure accumulator valve providing fluid communication between the low pressure accumulator and the hydraulic displacement units and the low pressure accumulator valve having at least three control positions, wherein:

when the low pressure accumulator valve is set to the first control position, the low pressure accumulator valve fluidly disconnects the low pressure accumulator from the hydraulic displacement units;

when the low pressure accumulator valve is set to the second control position, the low pressure accumulator valve provides fluid communication between the low pressure accumulator and selectively the second fluid port of at least one of the first and the second hydraulic displacement unit, for example through the second pump valve; and when the low pressure accumulator valve is set to the third control position, the low pressure accumulator valve provides fluid communication between the low pressure accumulator and selectively the first fluid port of at least one of the first and the second hydraulic displacement unit, for example through the first pump valve.

The at least one pump valve and the at least one accumulator valve may further be configured such that:

when the pump valve is set to the first position/configuration and the accumulator valve is set to the second position/configuration, the high pressure accumulator is fluidly connected to the first fluid ports of the first and the second hydraulic displacement unit and the low pressure accumulator is fluidly connected to the second fluid ports of the first and the second hydraulic displacement unit;

when the pump valve is set to the first position/configuration and the accumulator valve is set to the third position/configuration, the high pressure accumulator is fluidly connected to the second fluid ports of the first and the second hydraulic displacement unit and the low pressure accumulator is fluidly connected to the first fluid ports of the first and the second hydraulic displacement unit;

when the pump valve is set to the second position/configuration and the accumulator valve is set to the second position/configuration, the high pressure accumulator is fluidly connected to the first fluid port of the second hydraulic displacement unit, the low pressure accumulator is fluidly connected to the second fluid port of the second hydraulic displacement unit, and the accumulator assembly is fluidly disconnected from the first hydraulic displacement unit;

when the pump valve is set to the second position/configuration and the accumulator valve is set to the third position/configuration, the high pressure accumulator is fluidly connected to the second fluid port of the second hydraulic displacement unit, the low pressure accumulator is fluidly connected to the first fluid port of the second hydraulic displacement unit, and the accumulator assembly is fluidly disconnected from the first hydraulic displacement unit;

when the pump valve is set to the third position/configuration and the accumulator valve is set to the second position/configuration, the high pressure accumulator is fluidly connected to the first fluid port of the first hydraulic displacement unit, the low pressure accumulator is fluidly connected to the second fluid port of the first hydraulic displacement unit, and the accumulator assembly is fluidly disconnected from the second hydraulic displacement unit; and when the pump valve is set to the third position/configuration and the accumulator valve is set to the third position/configuration, the high pressure accumulator is fluidly connected to the second fluid port of the first hydraulic displacement unit, the low pressure accumulator is fluidly connected to the first fluid port of the first hydraulic displacement unit, and the accumulator assembly is fluidly disconnected from the second hydraulic displacement unit.

The first hydraulic displacement unit and the second hydraulic displacement unit may be drivingly engaged or selectively drivingly engaged with the output shaft through a summing gearbox, the summing gearbox configured to sum a first torque provided by the first hydraulic displacement unit and a second torque provided by the second hydraulic displacement unit at the output shaft.

The summing gearbox may additionally be configured to selectively one of:
drivingly engage only one of the first and the second hydraulic displacement unit with the output shaft; and
disengage both hydraulic displacement units from the output shaft.

Furthermore, the proposed dual motor hydraulic hybrid transmission may include an electronic control unit configured to control one or more of the control valves. in other words, the control unit may be configured to switch the control valves to one or more control configurations. For example, the control unit may be configured to control the control valve based on an input from an operator and/or based measurement data provided by one or more sensors. The sensors may include a speed sensor and the measurement data may include speed data, for example.

BRIEF DESCRIPTION OF THE DRAWINGS

Preferred embodiments of the presently proposed dual motor hydraulic hybrid transmission is described in the following detailed description and is depicted in the accompanying drawing in which.

DETAILED DESCRIPTION OF THE INVENTION

Figure 1:
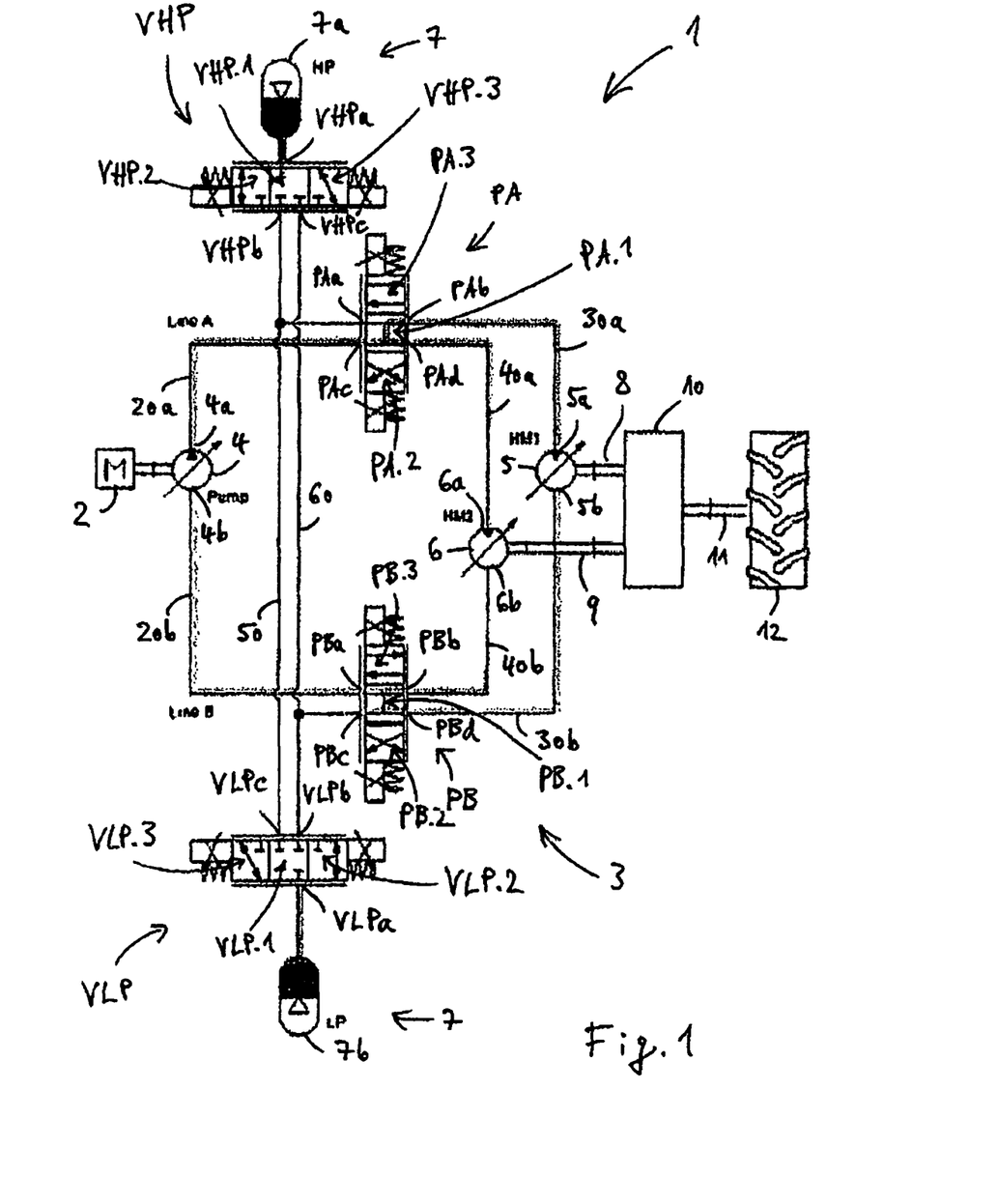
FIG. 1 shows a first embodiment of a dual motor hydraulic hybrid transmission in one mode of operation.

FIG. 1 shows a dual motor hydraulic hybrid transmission 1 of an automotive vehicle (not shown). The vehicle may be an off-highway vehicle such as a wheel loader, for example. The transmission 1 comprises an internal combustion engine 2 and a hydraulic circuit 3. The hydraulic circuit 3 comprises a hydrostatic pump 4 drivingly engaged with the engine 2, a first hydrostatic motor 5 and a second hydrostatic motor 6. The hydrostatic motors 5, 6 are in fluid communication with the pump 4 through a first pump valve PA, through a second pump valve PB and through fluid lines 20a, 20b, 30a, 30b, 40a, 40b.

A control position or spool position of the pump valves PA, PB can be controlled through electromagnetic forces or through hydraulic forces, for example. In the latter case, the pump valves PA, PB can be controlled through corresponding pilot valves (not shown). The pump valves PA, PB (or the corresponding pilot valves, if applicable) can be controlled through an electronic control unit (not shown) via wired or wireless electromagnetic signals.

In other words, the fluid lines 20a, 20b, 30a, 30b, 40a, 40b connect the pump 4 and the motors 5, 6 in such a way and the valves PA, PB are configured such that by switching the valves PA, PB to corresponding control positions or control configurations the pump 4 may be selectively fluidly connected to at least one of the motors 5, 6. Specifically, in one control configuration of the valves PA, PB, the pump 4 is fluidly connected to both motors 5, 6. In another control configuration of the valves PA, PB, the pump 4 is fluidly connected to the first motor 5 and fluidly disconnected from the second motor 6. In another control configuration of the valves PA, PB, the pump 4 is fluidly connected to the second motor 6 and fluidly disconnected from the first motor 5. This will be explained in more detail further below.

A transmission shaft 8 of the first motor 5 and a transmission shaft 9 of the second motor 6 are selectively drivingly engaged with and output shaft 11 of the transmission 1 through a summing gearbox 10. The output shaft 11 is drivingly engaged or selectively drivingly engaged with a vehicle output 12. The vehicle output 12 may include at least one of a drive shaft, a vehicle axle, a final drive and one or more wheels, for example. The gearbox 10 is configured to selectively sum a torque provided by the motors 5, 6 at the output shaft 11. That is, the gearbox 10 may selectively simultaneously couple the output shafts 8, 9 of both motors 5, 6 to the output shaft 11. The gearbox 10 is further configured to selectively disengage the output shaft 11 from both motors 5, 6 at the same time. The gearbox 10 is further configured to selectively drivingly engage only one of the motors 5, 6 with the output shaft 11 at a given time. That is, the gearbox 10 is configured to selectively drivingly engage the first motor 5 with the output shaft 11 while disengaging the second motor 6 from the output shaft. And the gearbox 10 is configured to selectively drivingly engage the second motor 6 with the output shaft 11 while disengaging the first motor 5 from the output shaft 11.

The transmission 1 further comprises a hydraulic accumulator assembly 7 including a high pressure accumulator 7a and a low pressure accumulator 7b. The accumulators 7a, 7b are configured as compressed gas accumulators. The accumulators 7a, 7b are configured as hollow vessels including a closed bladder filled with an inert gas such as nitrogen. The accumulators 7a, 7b may be pressurized by filling or partially filling the accumulator vessel with a hydraulic fluid such as oil, thereby compressing the gas contained in the bladder. The accumulators 7a, 7b may be de-pressurized by letting the gas contained in the bladder expand such that hydraulic fluid contained in the accumulator vessel is displaced out of the vessel, thereby creating a fluid flow.

The accumulator assembly 7 is in fluid communication with the hydraulic circuit 3 through a high pressure accumulator valve VHP, through a low pressure accumulator valve VLP and through fluid lines 50, 60. The high pressure accumulator 7a is in fluid communication with the hydraulic circuit 3 through the high pressure accumulator valve VHP and through the fluid lines 50, 60, and the low pressure accumulator 7b is in fluid communication with the hydraulic circuit 3 through the low pressure accumulator valve VLP and through the fluid lines 50, 60.

A control position or spool position of the accumulator valves VHP, VLP can be controlled through electromagnetic forces or through hydraulic forces, for example. In the latter case, the accumulator valves VHP, VLP can be controlled through corresponding pilot valves (not shown). Like the pump valves PA, PB the accumulator valves VHP, VLP (or the corresponding pilot valves, if applicable) can be controlled through the above mentioned electronic control unit (not shown) via wired or wireless electromagnetic signals.

In the following, the design of the pump valves PA, PB and the connection between the pump 4 and the motors 5, 6 provided by the pump valves PA, PB and by the fluid lines 20a, 20b, 30a, 30b, 40a, 40b of the hydraulic circuit 3 will be explained in detail.

The pump 4 has a first fluid port 4a and a second fluid port 4b. The first motor 5 has a first fluid port 5a and a second fluid port 5b. The second motor 6 has a first fluid port 6a and a second fluid port 6b.

The first pump valve PA is a 4/3-way directional valve having four fluid ports PAa, PAb, PAc, PAd and three control positions PA.1, PA.2, PA.3.

When the pump valve PA is switched or set to the first control position PA.1 (the center position of the valve PA in FIG. 1), all fluid ports PAa-d of the pump valve PA are mutually fluidly connected so that hydraulic fluid may flow between all fluid ports PAa-d.

When the pump valve PA is switched or set to the second control position PA.2 (the bottom-most position of the valve PA in FIG. 1), the first fluid port PAa is fluidly connected to the fourth fluid port PAd so that hydraulic fluid study flow between the first fluid port PAa and the fourth fluid port PAd, and the second fluid port PAb is fluidly connected to the third fluid port PAc so that hydraulic fluid may flow between the second fluid port PAb and the third fluid port PAc. Further, when the pump valve PA is in the second control position PA.2, both the first fluid port PAa and the fourth fluid port PAd are fluidly disconnected from both the second fluid port PAb and from the third fluid port PAc so that no hydraulic fluid may flow between the fluid ports PAa, PAd on the one hand and the fluid ports PAb, PAc on the other hand.

When the pump valve PA is switched or set to the third control position PA.3 (the top-most position of the valve PA in FIG. 1), the first fluid port PAa is fluidly connected to the second fluid port PAb so that hydraulic fluid may flow between the first fluid port PAa and the second fluid port PAb, and the third fluid port PAc is fluidly connected to the fourth fluid port PAd so that hydraulic fluid may flow between the third fluid port PAc and the fourth fluid port PAd. Further, when the pump valve PA is in the third control position PA.3, both the first fluid port PAa and the second fluid port PAb are fluidly disconnected from both the third fluid port PAc and from the fourth fluid port PAd so that no hydraulic fluid may flow between the fluid ports PAa, PAb on the one hand and the fluid ports PAc, PAd on the other hand.

The second pump valve PB is identical to the first pump valve PA. That is, the second pump valve, too, is a 4/3-way directional valve having four fluid ports PBa, PBb, PBc, PBd and three control positions PB.1, PB.2, PB.3. The fluid connection/disconnection between the fluid ports PBa, PBb, PBc, PBd of the second pump valve PB in the three control positions PB.1, PB.2, PB.3 of the second pump valve PB is analogous to that described with respect to the first pump valve PA. To a skilled person this is immediately apparent from the illustration of the valves PA and PB in FIG. 1.

The fluid line 20a fluidly connects the first fluid port 4a of the pump 4 to the third fluid port PAc of the first pump valve PA. The fluid line 20b fluidly connects the second fluid port 4b of the pump 4 to the first fluid port PBa of the second pump valve PB. The fluid line 30a fluidly connects the second fluid port PAb of the first pump valve PA to the first fluid port 5a of the first motor 5. The fluid line 30b fluidly connects the fourth fluid port PBd of the second pump valve PB to the second fluid port 5b of the first motor 5. The fluid line 40a fluidly connects the fourth fluid port PAd of the first pump valve PA to the first fluid port 6a of the first motor 6. The fluid line 40b fluidly connects the second fluid port PBb of the second pump valve PB to the second fluid port 6b of the first motor 6.

The above mentioned control unit is configured to control the pump valves PA, PB such that, at a given time, both valves are in their first control position PA.1 and PB.1, in their second control position PA.2 and PB.2, or in their third control position PA.3 and PB.3. In other words, at a given time the pump valves PA, PB can be in one of three possible control configurations, termed P.1, P.2 and P.3 in the following. In the first control configuration P.1 the first pump valve PA is in the first control position PA.1 and the second pump valve PB is in the first control position PB.1. In the second control configuration P.2 the first pump valve PA is in the second control position PA.2 and the second pump valve PB is in the second control position PB.2. And in the third control configuration P.3 the first pump valve PA is in the third control position PA.3 and the second pump valve PB is in the third control position PB.3.

From the above description of the design of the pump valves PA, PB and of the connection between pump 4 and the motors 5, 6 through the pump valves PA, PB and the fluid lines 20a-b, 30a-b, 40a-b the following is immediately apparent:

When the pump valves PA, PA are in the first control configuration P.1, the pump 4 is fluidly connected to both motors 5, 6 in a closed circuit comprising the fluid lines 20a-b, 30a-b, 40a-b. Specifically, in the first control configuration P.1 the first fluid port 4a of the pump 4 is fluidly connected to the first fluid port 5a of the first motor 5 and to the first fluid port 6a of the second motor, and the second fluid port 4b of the pump 4 is fluidly connected to the second fluid port 5b of the first motor 5 and to the second fluid port 6b of the second motor 6.

When the pump valves PA, PA are in the second control configuration P.2, the pump 4 is fluidly connected to the first motor 5 in a closed circuit comprising the fluid lines 20a-b, 30a-b, and fluidly disconnected from the second motor 6. Specifically, in the second control configuration P.2 the first fluid port 4a of the pump 4 is fluidly connected to the first fluid port 5a of the first motor 5, and the second fluid port 4b of the pump 4 is fluidly connected to the second fluid port 5b of the first motor 5.

When the pump valves PA, PA are in the third control configuration P.3, the pump 4 is fluidly connected to the second motor 6 in a closed circuit comprising the fluid lines 20a-b, 40a-b, and fluidly disconnected from the first motor 5. Specifically, in the third control configuration P.2 the first fluid port 4a of the pump 4 is fluidly connected to the first fluid port 6a of the second motor 6, and the second fluid port 4b of the pump 4 is fluidly connected to the second fluid port 6b of the second motor 6.

In the following, the design of the accumulator valves VHP, VLP and the connection between the accumulator assembly 7 and the motors 5, 6 provided by the accumulator valves VHP, VLP, the fluid lines 50, 60, the pump valves PA, PB and the fluid lines 30a-b, 40a-b of the hydraulic circuit 3 will be explained in detail.

The high pressure accumulator valve VHP is a 3/3-way directional valve having three fluid ports VHPa, VHPb, VHPc and three control positions VHP.1, VHP.2, VHP.3.

When the high pressure accumulator valve VHP is switched or set to the first control position VHP.1 (the center position of the valve VHP in FIG. 1), all fluid ports VHPa-c are fluidly disconnected from one another so that no hydraulic fluid may flow between the ports VHPa-c.

When the high pressure accumulator valve VHP is switched or set to the second control position VHP.2 (the left-most position of the valve VHP in FIG. 1), the first fluid port VHPa is fluidly connected to the second fluid port VHPb so that hydraulic fluid may flow between the first fluid port VHPa and the second fluid port VHPb. Further, when the high pressure accumulator valve is in the second control position VHP.2, both the first fluid port VHPa and the second fluid port VHPb are fluidly disconnected from the third fluid port VHPc so that no hydraulic fluid may flow between the fluid ports VHPa, VHPb on the one hand and the fluid port VHPc on the other hand.

When the high pressure accumulator valve VHP is switched or set to the third control position VHP.3 (the right-most position of the valve VHP in FIG. 1), the first fluid port VHPa is fluidly connected to the third fluid port VHPc so that hydraulic fluid may flow between the first fluid port VHPa and the third fluid port VHPc. Further, when the high pressure accumulator valve is in the third control position VHP.3, both the first fluid port VHPa and the third fluid port VHPc are fluidly disconnected from the second fluid port VHPb so that no hydraulic fluid may flow between the fluid ports VHPa, VHPc on the one hand and the fluid port VHPb on the other hand.

The low pressure accumulator valve VLP is identical to the high pressure accumulator valve VHP. That is, the low pressure accumulator valve VLP, too, is a 3/3-way directional valve having three fluid ports VLPa, VLPb, VLPc and three control positions VLP.1, VLP.2, VLP.3. The fluid connection/disconnection between the fluid ports VLPa, VLPb, VLPc of the low pressure accumulator valve VLP in the three control positions VLP.1, VLP.2, VLP.3 of the low pressure accumulator valve VLP is analogous to that described with respect to the high pressure accumulator valve VHP (except that VLP.2 corresponds to the right-most position and that VLP.3 corresponds to the left most position of the valve VLP in FIG. 1). To a skilled person this is immediately apparent from the Illustration of the valves VHP and VLP in FIG. 1.

The first fluid port VHPa of the high pressure accumulator valve VHP is (permanently) fluidly connected to the high pressure accumulator 7a. Similarly, The first fluid port VLPa of the low pressure accumulator valve VLP is (permanently) fluidly connected to the low pressure accumulator 7b. The fluid line 50 fluidly connects the second fluid port VHPb of the high pressure accumulator valve VHP and the third fluid port VLPc of the low pressure accumulator valve VLP to the first fluid port PAa of the first pump valve PA. The fluid line 60 fluidly connects the third fluid port VHPc of the high pressure accumulator valve VHP and the second fluid port VLPb of the low pressure accumulator valve VLP to the third fluid port PBc of the second pump valve PB.

The above mentioned control unit is configured to control the accumulator valves VHP, VLP such that, at a given time, both valves are in their first control position VHP.1 and VLP.1, in their second control position VHP.2 and VLP.2, or in their third control position VHP.3 and VLP.3. In other words, at a given time the accumulator valves VHP, VLP can be in one of three possible control configurations, termed V.1, V.2 and VP.3 in the following. In the first control configuration V.1 the high pressure accumulator valve VHP is in the first control position VHP.1 and the low pressure accumulator valve VLP is in the first control position VLP.1. In the second control configuration V.2 the high pressure accumulator valve VHP is in the second control position VHP.2 and the low pressure accumulator valve VLP is in the second control position VLP.2. And in the third control configuration V.3 the high pressure accumulator valve VHP is in the third control position VHP.3 and the low pressure accumulator valve VLP is in the third control position VLP.3.

The control unit is furthermore configured to control the pump valve configurations P.1, P.2, P.3 and the accumulator valve configurations V.1, V.2, V.3 independently. That is, each of the pump valve configurations P.1, P.2, P.3 can be combined with each or the accumulator valve configurations V.1, V.2, V.3. Consequently, there is a total of 3·3=9 valve configurations of the transmission 1, termed T.1, T.2, T.3, T.4, T.5, T.6, T.7, T.8, T.9 in the following. These configurations are defined according to the following list:
T.1: P.1+V.1; T.2: P.1+V.2; T.3: P.1+V.3;
T.4: P.2+V.1; T.5: P.2+V.2; T.6: P.2+V.3;
T.7: P.3+V.1; T.8: P.3+V.2; T.9: P.3+V.3.

In the following, the modes of operation of the transmission 1 associated with the different valve configurations T.1 to T.9 will be explained. The fluid connection between the pump 4 and the motors 5, 6 through the pump valves PA, PB has been laid out in detail above. As the connection between the pump 4 and the motors 5, 6 is not affected by the configurations V.1, V.2, V.3 of the accumulator valves VHP, VLP, in the following discussion of the configurations T.1 to T.9 only the connection between the accumulators 7a, 7b on the one hand and the pump 4, the first motor 5 and the second motor 6 on the other hand will be explained in some detail.

In the mode of operation associated with the valve configuration T.1 (=P.1+V.1), the accumulator assembly 7 is fluidly disconnected from the hydraulic circuit 3, and the pump 4 is fluidly connected to the first motor 5 and the second motor 6 (see FIG. 1). This mode corresponds to the standard hydrostatic mode of a dual motor hydrostatic transmission. Both motors 5, 6 are driven by the pump 4.

Figure 2:
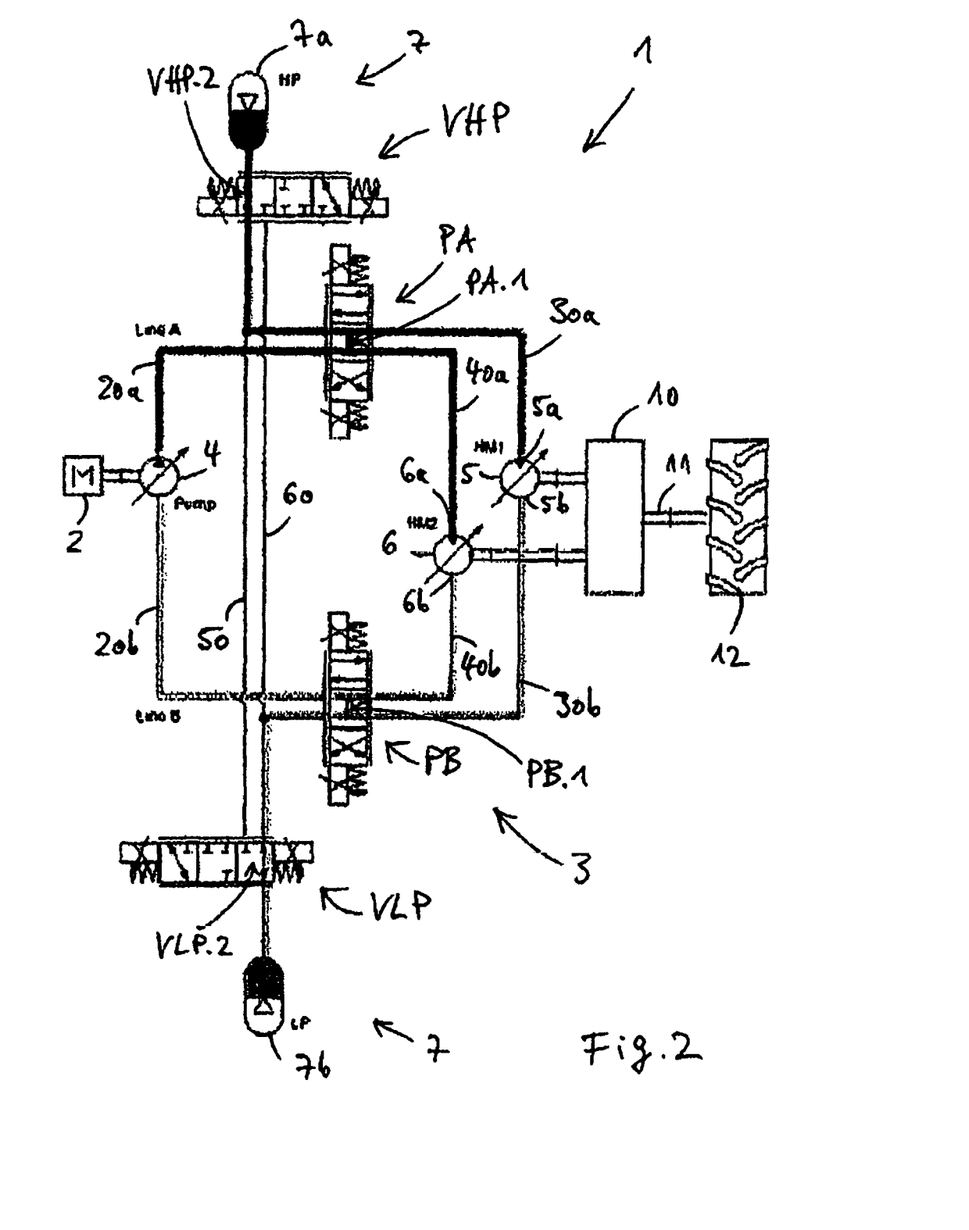
FIGS. 2-4 show the transmission of FIG. 1 in further modes of operation.

The mode of operation associated with the valve configuration T.2 (=P.1+V.2) is illustrated in FIG. 2. Here and in the following, recurring features are designated by the same reference signs. Again, the pump 4 is fluidly connected to both motors 5, 6. Additionally, the accumulator assembly 7 is fluidly connected to both motors 5, 6. Specifically, the high pressure accumulator 7a is fluidly connected to the first fluid port Sa of the first motor 5 and to the first fluid port 6a of the second motor 6, and the low pressure accumulator 7b is fluidly connected to the second fluid port 5b of the first motor 5 and to the second fluid port 6b of the second motor 6. This mode corresponds to a dual motor series hybrid mode. In this mode, hydraulic fluid stored under high pressure in the high pressure accumulator 7a may be displaced from the high pressure accumulator 7a to the low pressure accumulator 7b through both motors 5, 6, thereby applying additional torque to the motors 5, 6 during a forward movement of the vehicle, for example (forward acceleration). Also, in this mode the accumulators 7a, 7b may be used to decelerate the vehicle during a rearward movement of the vehicle (rearward deceleration).

In the mode of operation associated with the valve configuration T.3 (=P.1+V.3, not shown), the pump 4 is again fluidly connected to both motors 5, 6. Again, the accumulator assembly 7 is fluidly connected to both motors 5, 6. As opposed to the configuration T.2, in the configuration T.3 the high pressure accumulator 7a is fluidly connected to the second fluid port 5b of the first motor 5 and to the second fluid port 6b of the second motor 6, and the low pressure accumulator 7b is fluidly connected to the first fluid port 5a of the first motor 5 and to the first fluid port 6a of the second motor 6. Again, this mode corresponds to a dual motor series hybrid mode. In this mode, the accumulator assembly 7 may be used to decelerate the vehicle during a forward movement of the vehicle (forward deceleration) or to accelerate the vehicle during a rearward movement of the vehicle (rearward acceleration).

In the mode of operation associated with the valve configuration T.4 (=P.2+V.1, not shown), the accumulator assembly 7 is again fluidly disconnected from the hydraulic circuit 3. The pump 4 is fluidly connected to the first motor 5 and fluidly disconnected from the second motor 6. This mode corresponds to the standard hydrostatic mode of a single motor hydrostatic transmission using the first motor 5 only.

In the mode of operation associated with the valve configuration T.5 (=P.2+V.2, not shown), the pump 4 is fluidly connected to the first motor 5 and fluidly disconnected from the second motor 6. At the same time, the accumulator assembly 7 is fluidly connected to the second motor 6 and fluidly disconnected from the first motor 5. Specifically, the high pressure accumulator 7a is fluidly connected to the first fluid port 6a of the second motor 6, and the low pressure accumulator 7b is fluidly connected to the second fluid port 6b of the second motor 6.

In this mode, the (sub)circuit formed by the pump 4, the first motor 5 and the fluid lines 20a, 30a, 20b, 30b is fluidly isolated from the (sub)circuit formed by the accumulators 7a, 7b, the second motor 6 and the fluid lines 50, 60, 40a, 40b. The first motor 5 is powered only by the pump 4 and the second motor 6 is powered only by the accumulator assembly 7. The torque/power provided by the pump 4 and the torque/power provided by the accumulator assembly 7 is only summed in the gearbox 10. Therefore, the transmission 1 can be switched into this mode even if there is a pressure mismatch between the hydraulic pressure in the hydraulic circuit 3 and the hydraulic pressure in the accumulator assembly 7. This mode corresponds to a parallel mode and may be used during forward acceleration, for example.

The mode of operation associated with the valve configuration T.6 (=P.2+V.3, not shown) is identical to the above described mode associated with the valve configuration T.5, except that the fluid connection of the accumulators 7a, 7b to the second motor 6 is interchanged. Specifically, the high pressure accumulator 7a is now fluidly connected to the second fluid port 6b of the second motor 6 and the low pressure accumulator 7b is now fluidly connected to the first fluid port 6a of the second motor 6. Like the mode associated with the configuration T.5 described above, this mode corresponds to a parallel mode and may be used during rearward acceleration, for example.

In the mode of operation associated with the valve configuration T.7 (not shown), the accumulator assembly 7 is fluidly disconnected from the hydraulic circuit 3. The pump 4 is fluidly connected to the second motor 6 and fluidly disconnected from the first motor 5. This mode corresponds to the standard hydrostatic mode of a single motor hydrostatic transmission using the second motor 6 only.

Figure 3:
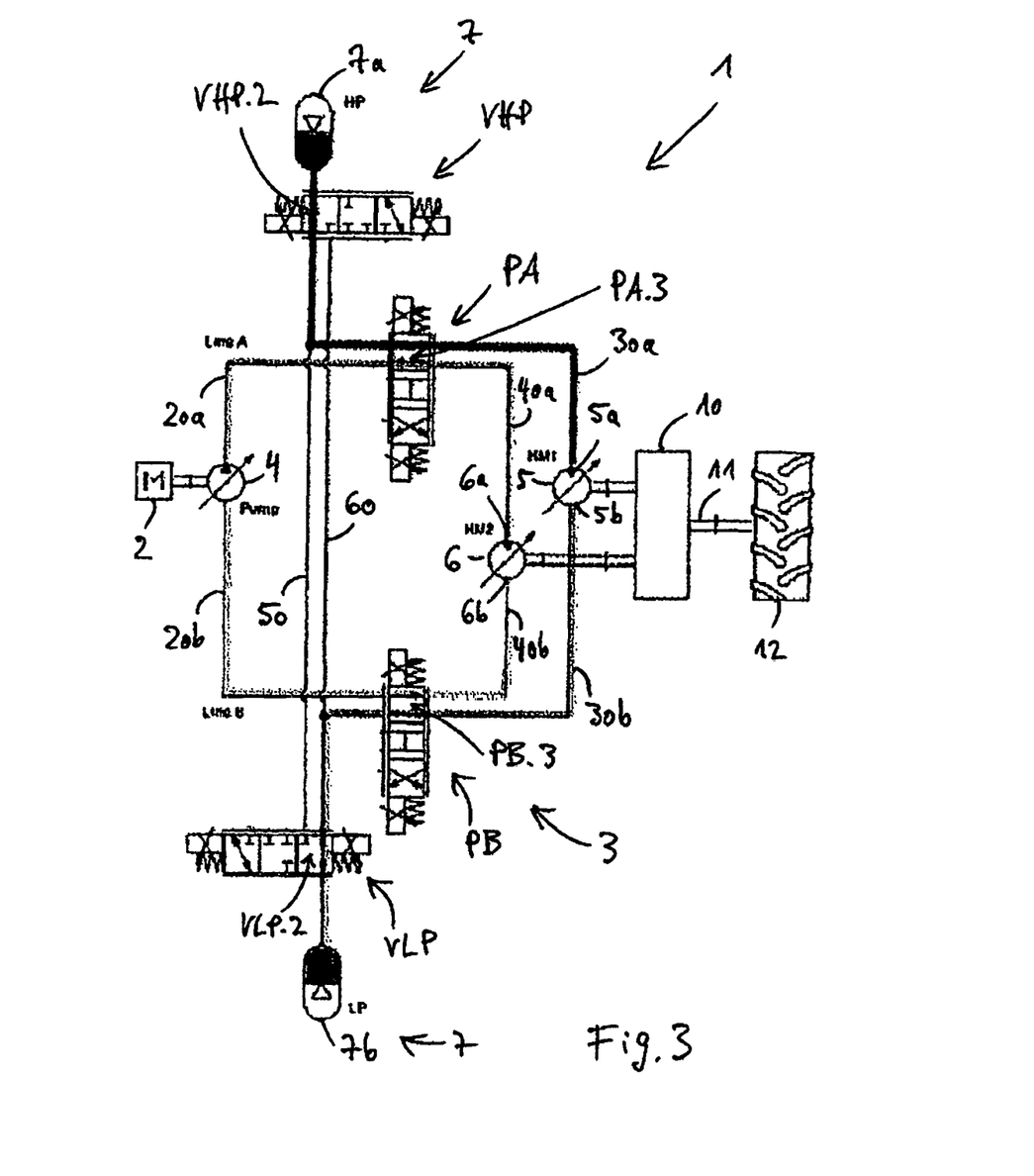

The mode of operation associated with the valve configuration T.8 (=P.3+V.2) is shown in FIG. 3. This mode is similar to the mode associated with the configuration T.5 described above. However, with respect to T.5 the roles of the first motor 5 and the second motor 6 are interchanged. The pump 4 is now fluidly connected to the second motor 6 and fluidly disconnected from the first motor 5. At the same time, the accumulator assembly 7 is fluidly connected to the first motor 5 and fluidly disconnected from the second motor 6. Specifically, the high pressure accumulator 7a is fluidly connected to the first fluid port 5a of the first motor 5, and the low pressure accumulator 7b is fluidly connected to the second fluid port 5b of the first motor 5.

Again, in this mode the (sub)circuit formed by the pump 4, the second motor 6 and the fluid lines 20a, 40a, 20b, 40b is fluidly isolated from the (sub)circuit formed by the accumulators 7a, 7b, the first motor 5 and the fluid lines 50, 60, 30a, 30b. The first motor 5 is powered only by the accumulator assembly 7 and the second motor 6 is powered only by the pump 4. The torque/power provided by the pump 4 and the torque/power provided by the accumulator assembly 7 is only summed in the gearbox 10. Therefore, the transmission 1 can be switched into this mode even if there is a pressure mismatch between the hydraulic pressure in the hydraulic circuit 3 and the hydraulic pressure in the accumulator assembly 7. This mode corresponds to a parallel mode and may be used during forward acceleration, for example.

Figure 4:
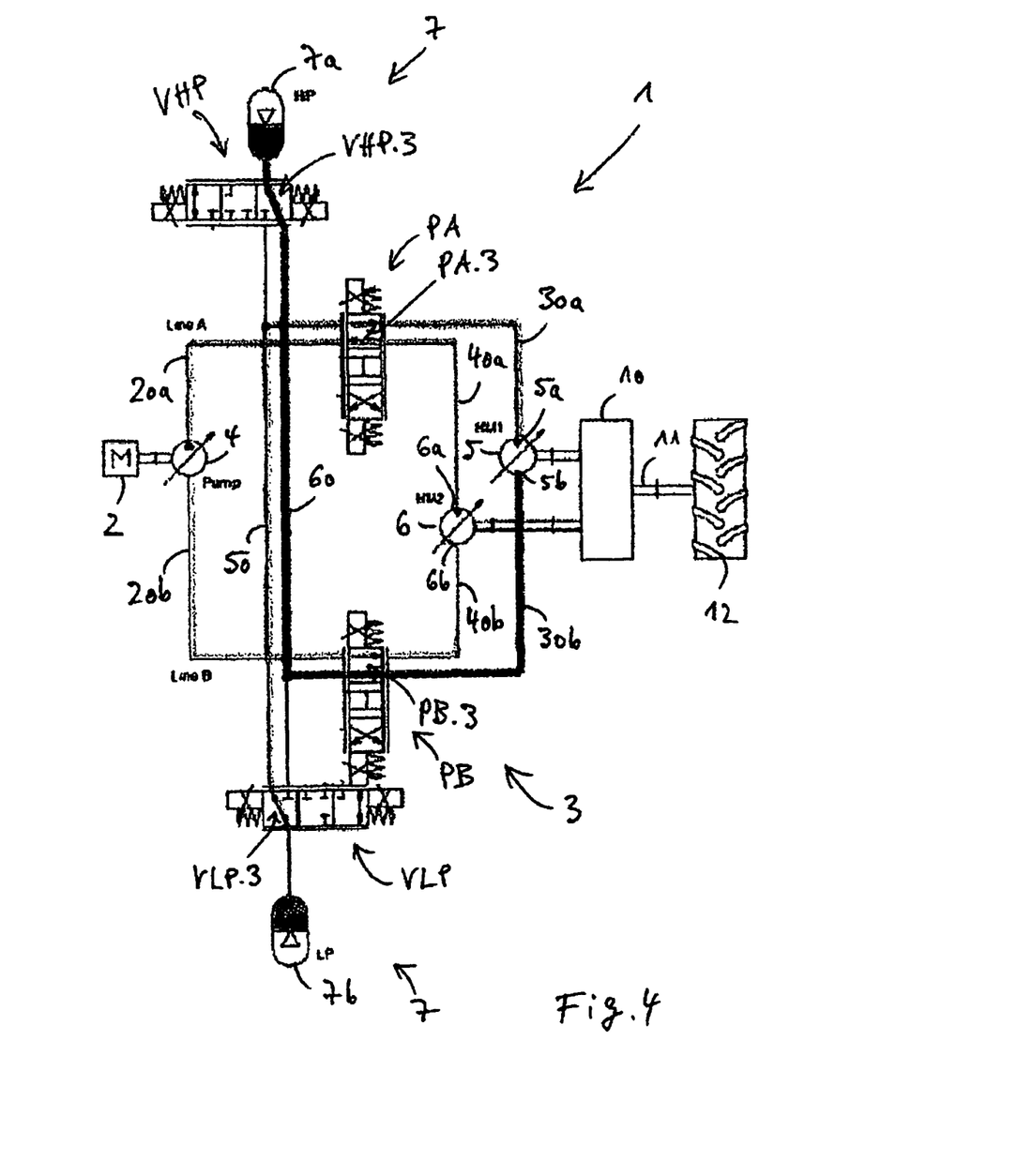

The mode of operation associated with the valve configuration T.9 (=P.3+V.3) is shown in FIG. 4. It is identical to the above described mode associated with the valve configuration T.8, except that the fluid connection of the accumulators 7a, 7b to the first motor 5 is interchanged. Specifically, the high pressure accumulator 7a is now fluidly connected to the second fluid port 5b of the first motor 5 and the low pressure accumulator 7b is now fluidly connected to the first fluid port 5a of the first motor 5. Like the mode associated with the configuration T.8 described above, this mode corresponds to a parallel mode and may be used during rearward acceleration, for example.

Figure 5:
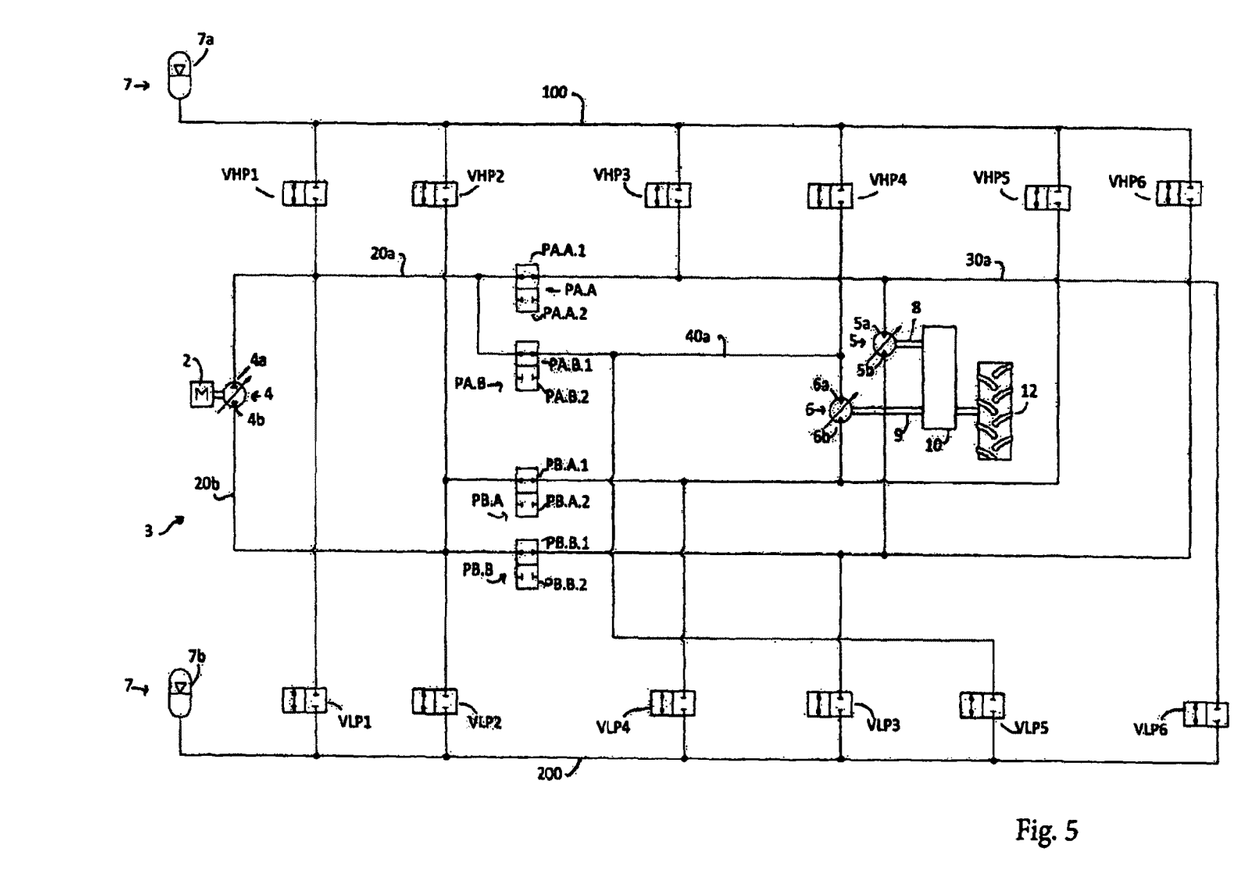
FIG. 5 shows a second embodiment of a dual motor hydraulic hybrid transmission.

FIG. 5 shows a dual motor hydraulic hybrid transmission 1' which is a variant of the transmission 1 of FIGS. 1-4. As before, recurring features are designated by the same reference signs. The embodiment of FIG. 5 differs from the embodiment of FIGS. 1-4 in that the accumulators 7a, 7b can be selectively fluidly connected to the motors 5, 6 mostly independently of the control configuration of the pump valves PA, PB. In addition, each of the pump valves PA, PB is realized with two 2/2 valves. More specifically, valve PA is realized with the two valves PA.A, PA.B, and valve PB is realized with the two valves PB.A and PB.B.

As a skilled person readily understands from the schematics of FIG. 5, the pump 4 can be selectively fluidly connected to both motors 5, 6 or to only one of the motors 5, 6.

For example, the pump 4 can be fluidly connected to both motors 5, 6 by switching the first pump valves PA.A and PA.B to the first control position PA.A.1 and PA.B.1 (as shown in FIG. 5), respectively, and by simultaneously switching the second pump valves PB.A and PB.B to the first control position PB.A.1 and PB.B.1, respectively. The pump 4 can be fluidly connected to the first motor 5 and, at the same time, fluidly disconnected from the second motor 6 by switching each of the pump valves PA.A, PA.B, PB.A and PB.B to their respective control positions PA.A.1, PA.B.2, PB.A.2 and PB.B.2. The pump 4 can be fluidly connected to the second motor 6 and, at the same time, fluidly disconnected from the first motor 5 by switching each of the pump valves PA.A, PA.B, PB.A and PB.B to their respective control positions PA.A.2, PA.B.1, PB.A.1 and PB.B.2.

The accumulator assembly 7 comprising the high pressure accumulator 7a and the low pressure accumulator 7b can be selectively fluidly connected to the hydraulic circuit using 2/2 valves VHP1, VHP2, VHP3, VHP4, VHP5, VHP6, VLP1, VLP2, VLP3, VLP4, VLP5, VLP6. Each of the valves VHP1 . . . 6, VLP1 . . . 6 is a 2/2-way shut-off valve having an open position and a closed position.

The high pressure accumulator 7a can be selectively fluidly connected to each of the fluid lines 20a, 30a, 40a, 20b, 30b, 40b through a set of six high pressure accumulator valves VHP1, VHP2, VHP3, VHP4, VHP5, VHP6.

Valve VHP1, when it is in the open position, selectively fluidly connects the high-pressure accumulator 7a, via its fluid line 100, to the fluid line 20a. When it is in the closed position, it isolates fluid line 20a from the high-pressure accumulator 7a.

Valve VHP2, when it is in the open position, selectively fluidly connects the high-pressure accumulator 7a, via its fluid line 100, to the fluid line 20b. When it is in the closed position, it isolates fluid line 20b from the high-pressure accumulator 7a.

Valve VHP3, when it is in the open position, selectively fluidly connects the high-pressure accumulator 7a, via its fluid line 100, to the fluid line 30a. When it is in the closed position, it isolates fluid line 30a from the high-pressure accumulator 7a.

Valve VHP4, when it is in the open position, selectively fluidly connects the high-pressure accumulator 7a, via its fluid line 100, to the fluid line 40a. When it is in the closed position, it isolates fluid line 40a from the high-pressure accumulator 7a.

Valve VHP5, when it is in the open position, selectively fluidly connects the high-pressure accumulator 7a, via its fluid line 100, to the fluid line 40b. When it is in the closed position, it isolates fluid line 40b from the high-pressure accumulative 7d.

Valve VHP6, when it is in the open position, selectively fluidly connects the high-pressure accumulator 7a, via its fluid line 100, to the fluid line 30b. When it is in the closed position, it isolates fluid line 30b from the high-pressure accumulator 7a.

Therefore, a skilled person readily understands that a combination of the valves VHP1, VHP2, VHP3, VHP4, VHP5, VHP6 can be used to selectively one of: disconnect the high pressure accumulator 7a from the hydraulic circuit 3; fluidly connect the high pressure accumulator 7a to the first fluid port 5a of the first motor 5; fluidly connect the high pressure accumulator 7a to the first fluid port 6a of the second motor 6; fluidly connect the high pressure accumulator 7a to the second fluid port 5b of the first motor 5; fluidly connect the high pressure accumulator 7a to the second fluid port 6b of the second motor 6; fluidly connect the low pressure accumulator 7b to the first fluid port 5a of the first motor 5 and to the first fluid port 6a of the second motor 6; and fluidly connect the low pressure accumulator 7b to the second fluid port 5b of the first motor 5 and to the second fluid port 6b of the second motor 6.

Furthermore, when the pump valves PA.A, PA.B, PB.A, PB.B are switched to their first control position PA.A.1, PA.B.1, PB.A.1, PB.B.1, respectively, the high pressure accumulator 7a may be simultaneously fluidly connected to the first fluid ports 5a, 6a of the first motor 5 and of the second motor 6, respectively, through valve VHP1. Similarly, when the pump valves PA.A, PA.B, PB.A, PB.B are switched to their first control position PA.A.1, PA.B.1, PB.A.1, PB.B.1, respectively, the high pressure accumulator 7a may be simultaneously fluidly connected to the second fluid ports 5b, 6b of the first motor 5 and of the second motor 6, respectively, through valve VHP2.

In an analogous manner, the low pressure accumulator 7b can be selectively fluidly connected to each of the fluid lines 20a, 20b, 30a, 30b, 40a, 40b through a set of low pressure accumulator valves VLP1, VLP2, VLP3, VLP4, VLP5, VLP6.

Valve VLP1, when it is in the open position, selectively fluidly connects the high-pressure accumulator 7a, via its fluid line 100, to the fluid line 20a. When it is in the closed position, it isolates fluid line 20a from the high-pressure accumulator 7a.

Valve VLP2, when it is in the open position, selectively fluidly connects the high-pressure accumulator 7a, via its fluid line 100, to the fluid line 20b. When it is in the closed position, it isolates fluid line 20b from the high-pressure accumulator 7a.

Valve VLP3, when it is in the open position, selectively fluidly connects the high-pressure accumulator 7a, via its fluid line 100, to the fluid line 30b. When it is in the closed position, it isolates fluid line 30b from the high-pressure accumulator 7a.

Valve VLP4, when it is in the open position, selectively fluidly connects the high-pressure accumulator 7a, via its fluid line 100, to the fluid line 40b. When it is in the closed position, it isolates fluid line 40b from the high-pressure accumulator 7a.

Valve VLP5, when it is in the open position, selectively fluidly connects the high-pressure accumulator 7a, via its fluid line 100, to the fluid line 40a. When it is in the closed position, it isolates fluid line 40a from the high-pressure accumulator 7a.

Valve VLP6, when it is in the open position, selectively fluidly connects the high-pressure accumulator 7a, via its fluid line 100, to the fluid line 30a. When it is in the closed position, it isolates fluid line 30a from the high-pressure accumulator 7a.

Therefore, a skilled person readily understands that the valves VLP1, VLP2, VLP3, VLP4, VLP5, VLP6 can be used to selectively one of: disconnect the low pressure accumulator 7b from the hydraulic circuit 3; fluidly connect the low pressure accumulator 7b to the first fluid port 5a of the first motor 5; fluidly connect the low pressure accumulator 7b to the first fluid port 6a of the second motor 6; fluidly connect the low pressure accumulator 7b to the second fluid port 5b of the first motor 5; fluidly connect the low pressure accumulator 7b to the second fluid port 6b of the second motor 6; fluidly connect the low pressure accumulator 7b to the first fluid port 5a of the first motor 5 and to the first fluid port 6a of the second motor 6; and fluidly connect the low pressure accumulator 7b to the second fluid port 5b of the first motor 5 and to the second fluid port 6b of the second motor 6.

Furthermore, when the pump valves PA.A, PA.B, PB.A, PB.B are switched to their first control position PA.A.1, PA.B.1, PB.A.1, PB.B.1, respectively, the low pressure accumulator 7b may be simultaneously fluidly connected to the first fluid ports 5a, 6a of the first motor 5 and of the second motor 6, respectively, through valve VLP1. Similarly, when the pump valves PA.A, PA.B, PB.A, PB.B are switched to their first control position PA.A.1, PA.8.1, PB.A.1, PB.B.1, respectively, the low pressure accumulator 7b may be simultaneously fluidly connected to the second fluid ports 5b, 6b of the first motor 5 and the second motor 6 through valve VLP2.

In addition, two extra 2/2 valves (e.g. VHP and VP) could be used to isolate accumulators 7a and 7b from lines 100 and 200 respectively, for extra safety and to reduce leakage.

Thus, a skilled person readily understands how the transmission 1' of FIG. 5 can be operated in the same modes of operation as the transmission 1 of FIGS. 1-4.

The advantage of the presently proposed transmission with respect to the simple series hybrid mode is the ability to sum torque at the mechanical transmission input at any level of accumulator pressure, thus decoupling the accumulator pressure from the road load. in addition, it allows hydraulic disconnection of one of the two motors even in standard hydrostatic mode, thus reducing losses.

In certain embodiments, it may be possible to simplify the circuit by removing some of the modes. In particular FIGS. 1-4 show the basic operating modes and the operation of the hydraulic control devices to obtain each mode. In particular, the 3/3 accumulator valves (or their equivalent realization with a different embodiment) resolve the function of connecting each accumulator to the high pressure line of the hydraulic circuit 3, the low pressure line of the hydraulic circuit 3 or neither, while the 4/3 line valves switch between series and parallel modes. The series mode corresponds to the center position, when both motors are connected to the same pressure source, while the parallel mode is realized by connecting the pump to the first motor and the accumulator to the second motor. In this configuration, switching the accumulator valves changes the pressure acting on the second motor (equivalent to switching from boosting vs. regen).

An electrical variant is also possible. The electrical variant comprises a generator driving one motor, and a battery driving the other one, as opposed to both powering the two motors together. The electrical variant provides some advantage in terms of overall efficiency by reducing power electronics losses in certain conditions.

The invention claimed is:

1. A dual motor hydraulic hybrid transmission, comprising:
a power source;
a hydraulic circuit comprising:
a hydraulic pump drivingly engaged or selectively drivingly engaged with the power source;
a first hydraulic displacement unit in fluid communication with the hydraulic pump; and
a second hydraulic displacement unit in fluid communication with the hydraulic pump;
a hydraulic accumulator assembly comprising a high pressure accumulator and a low pressure accumulator, the hydraulic accumulator assembly in fluid communication with the hydraulic circuit;
one or more control valves; and
an output shaft;
wherein the first hydraulic displacement unit is drivingly engaged or selectively drivingly engaged with the output shaft, and wherein the second hydraulic displacement unit is drivingly engaged or selectively drivingly engaged with the output shaft; and
wherein the control valves are configured to selectively:
fluidly connect the hydraulic pump to the first hydraulic displacement unit while fluidly disconnecting the hydraulic pump from the second hydraulic displacement unit; and, simultaneously,
fluidly connect the hydraulic accumulator assembly to the second hydraulic displacement unit while fluidly disconnecting the hydraulic accumulator assembly from first hydraulic displacement unit;
wherein the control valves are additionally configured to selectively:
fluidly connect the hydraulic pump to the second hydraulic displacement unit while fluidly disconnecting the hydraulic pump from the first hydraulic displacement unit; and simultaneously,
fluidly connect the hydraulic accumulator assembly to the first hydraulic displacement unit while fluidly disconnecting the hydraulic accumulator assembly from second hydraulic displacement unit.

2. The dual motor hydraulic hybrid transmission according to claim 1, wherein the control valves are additionally configured to selectively simultaneously fluidly connect the hydraulic pump to the first hydraulic displacement unit and to the second hydraulic displacement unit.

3. The dual motor hydraulic hybrid transmission according to claim 1, wherein the control valves comprise at least one pump valve, the pump valve providing fluid communication between the hydraulic pump and the hydraulic displacement units and the pump valve having three control positions or control configurations; wherein
when the pump valve is set to the first position/configuration, the pump valve fluidly connects the hydraulic pump to the first hydraulic displacement unit and to the second hydraulic displacement unit;
when the pump valve is set to the second position/configuration, the pump valve fluidly connects the hydraulic pump to the first hydraulic displacement unit and fluidly disconnects the hydraulic pump from the second hydraulic displacement unit; and
when the pump valve is set to the third position/configuration, the pump valve fluidly connects the hydraulic pump to the second hydraulic displacement unit and fluidly disconnects the hydraulic pump from the first hydraulic displacement unit.

4. The dual motor hydraulic hybrid transmission of claim 3, wherein the hydraulic pump, the first hydraulic displacement unit and the second hydraulic displacement unit each comprise a first fluid port and a second fluid port;
wherein the control valves comprise a first pump valve, the first pump valve providing fluid communication between the first fluid port of the hydraulic pump, the first fluid port of the first hydraulic displacement unit and the first fluid port of the second hydraulic displacement unit, and the first pump valve having three control positions, wherein:
when the first pump valve is set to the first control position, the first pump valve fluidly connects the first fluid port of the hydraulic pump to the first fluid port of the first hydraulic displacement unit and to the first fluid port of the second hydraulic displacement unit;
when the first pump valve is set to the second control position, the first pump valve fluidly connects the first fluid port of the hydraulic pump to the first fluid port of the first hydraulic displacement unit and fluidly disconnects the first fluid port of the hydraulic pump from the first fluid port of the second hydraulic displacement unit; and
when the first pump valve is set to the third control position, the first pump valve fluidly connects the first fluid port of the hydraulic pump to the first fluid port of the second hydraulic displacement unit and fluidly disconnects the first fluid port of the hydraulic pump from the first fluid port of the first hydraulic displacement unit; and wherein the control valves comprise a second pump valve, the second pump valve providing fluid communication between the second fluid port of the hydraulic pump, the second fluid port of the first hydraulic displacement unit and the second fluid port of the second hydraulic displacement unit, and the second pump valve having three control positions, wherein:

when the second pump valve is set to the first control position, the second pump valve fluidly connects the second fluid port of the hydraulic pump to the second fluid port of the first hydraulic displacement unit and to the second fluid port of the second hydraulic displacement unit;

when the second pump valve is set to the second control position, the second pump valve fluidly connects the second fluid port of the hydraulic pump to the second fluid port of the first hydraulic displacement unit and fluidly disconnects the second fluid port of the hydraulic pump from the second fluid port of the second hydraulic displacement unit; and when the second pump valve is set to the third control position, the second pump valve fluidly connects the second fluid port of the hydraulic pump to the second fluid port of the second hydraulic displacement unit and fluidly disconnects the second fluid port of the hydraulic pump from the second fluid port of the first hydraulic displacement unit.

5. The dual motor hydraulic hybrid transmission according to claim 1, wherein the control valves are additionally configured to selectively simultaneously fluidly connect the hydraulic accumulator assembly to the first hydraulic displacement unit and to the second hydraulic displacement unit.

6. The dual motor hydraulic hybrid transmission according to claim 1, wherein the first hydraulic displacement unit and the second hydraulic displacement unit each comprise a first fluid port and a second fluid port, and wherein the control valves are configured such that fluidly connecting the hydraulic accumulator assembly to one or both of the first hydraulic displacement unit and the second hydraulic displacement unit includes selectively one of:

fluidly connecting the high pressure accumulator to the first fluid port or to the first fluid ports and, simultaneously, fluidly connecting the low pressure accumulator to the second fluid port or to the second fluid ports; and fluidly connecting the high pressure accumulator to the second fluid port or to the second fluid ports and, simultaneously, fluidly connecting the low pressure accumulator to the first fluid port or to the first fluid ports.

7. The dual motor hydraulic hybrid transmission according to claim 1, wherein the control valves comprise at least one accumulator valve, the accumulator valve providing fluid communication between the accumulator assembly and the hydraulic displacement units and the accumulator valve having at least three control positions or control configurations, wherein the accumulator valve is configured such that:

when the accumulator valve is set to the first position/configuration, the hydraulic accumulator assembly is fluidly disconnected from the hydraulic circuit;

when the accumulator valve is set to the second position/configuration, the high pressure accumulator is selectively fluidly connected to the first fluid port of at least one of the first and the second hydraulic displacement unit, and the low pressure accumulator is fluidly connected to the corresponding second fluid port or fluid ports of the hydraulic displacement unit or units to which the high pressure accumulator is fluidly connected; and when the accumulator valve is set to the third position/configuration, the high pressure accumulator is selectively fluidly connected to the second fluid port of at least one of the first and the second hydraulic displacement unit and the low pressure accumulator is fluidly connected to the corresponding first fluid port or fluid ports of the hydraulic displacement unit or units to which the high pressure accumulator is fluidly connected.

8. The dual motor hydraulic hybrid transmission according to claim 7, wherein the at least one accumulator valve is in fluid communication with the hydraulic displacement units through the at least one pump valve.

9. The dual motor hydraulic hybrid transmission according to claim 7, wherein the at least one accumulator valve comprises at least one high pressure accumulator valve, the high pressure accumulator valve providing fluid communication between the high pressure accumulator and the hydraulic displacement units and the high pressure accumulator valve having at least three control positions, wherein:

when the high pressure accumulator valve is set to the first control position, the high pressure accumulator valve fluidly disconnects the high pressure accumulator from the hydraulic displacement units;

when the high pressure accumulator valve is set to the second control position, the high pressure accumulator valve selectively fluidly connects the high pressure accumulator to the first fluid port of at least one of the first and the second hydraulic displacement unit; and when the high pressure accumulator valve is set to the third control position, the high pressure accumulator valve selectively fluidly connects the high pressure accumulator to the second fluid port of at least one of the first and the second hydraulic displacement unit; and wherein the at least one accumulator valve comprises a low pressure accumulator valve, the low pressure accumulator valve providing fluid communication between the low pressure accumulator and the hydraulic displacement units and the low pressure accumulator valve having at least three control positions, wherein:

when the low pressure accumulator valve is set to the first control position, the low pressure accumulator valve fluidly disconnects the low pressure accumulator from the hydraulic displacement units;

when the low pressure accumulator valve is set to the second control position, the low pressure accumulator valve selectively fluidly connects the low pressure accumulator to the second fluid port of at least one of the first and the second hydraulic displacement unit; and when the low pressure accumulator valve is set to the third control position, the low pressure accumulator valve selectively fluidly connects the low pressure accumulator to the first fluid port of at least one of the first and the second hydraulic displacement unit through the first pump valve.

10. The dual motor hydraulic hybrid transmission according to claim 1, wherein the first hydraulic displacement unit and the second hydraulic displacement unit are drivingly engaged or selectively drivingly engaged with the output shaft through a summing gearbox, the summing gearbox configured to sum a first torque provided by the first hydraulic displacement unit and a second torque provided by the second hydraulic displacement unit at the output shaft.

11. The dual motor hydraulic hybrid transmission of claim 10, wherein the summing gearbox is additionally configured to selectively one of: drivingly engage only one of the first and the second hydraulic displacement unit with the output shaft; and disengage both hydraulic displacement units from the output shaft.

12. A dual motor hydraulic hybrid transmission, comprising:
 a power source;
 a hydraulic circuit comprising:
 a hydraulic pump drivingly engaged or selectively drivingly engaged with the power source;
 a first hydraulic displacement unit in fluid communication with the hydraulic pump;
 a second hydraulic displacement unit in fluid communication with the hydraulic pump;
 wherein the hydraulic pump, the first hydraulic displacement unit and the second hydraulic displacement unit each comprise a first fluid port and a second fluid port;
 a hydraulic accumulator assembly comprising a high pressure accumulator and a low pressure accumulator, the hydraulic accumulator assembly in fluid communication with the hydraulic circuit;
 one or more control valves, the control valves comprise a first pump valve, a second pump valve, and at least one accumulator valve in fluid communication with the hydraulic displacement units through the at least one pump valve;
 the first pump valve providing fluid communication between the first fluid port of the hydraulic pump, the first fluid port of the first hydraulic displacement unit and the first fluid port of the second hydraulic displacement unit, and the first pump valve having three control positions, wherein:
 when the first pump valve is set to the first control position, the first pump valve fluidly connects the first fluid port of the hydraulic pump to the first fluid port of the first hydraulic displacement unit and to the first fluid port of the second hydraulic displacement unit;
 when the first pump valve is set to the second control position, the first pump valve fluidly connects the first fluid port of the hydraulic pump to the first fluid port of the first hydraulic displacement unit and fluidly disconnects the first fluid port of the hydraulic pump from the first fluid port of the second hydraulic displacement unit; and when the first pump valve is set to the third control position, the first pump valve fluidly connects the first fluid port of the hydraulic pump to the first fluid port of the second hydraulic displacement unit and fluidly disconnects the first fluid port of the hydraulic pump from the first fluid port of the first hydraulic displacement unit;
 the second pump valve providing fluid communication between the second fluid port of the hydraulic pump, the second fluid port of the first hydraulic displacement unit and the second fluid port of the second hydraulic displacement unit, and the second pump valve having three control positions, wherein:
 when the second pump valve is set to the first control position, the second pump valve fluidly connects the second fluid port of the hydraulic pump to the second fluid port of the first hydraulic displacement unit and to the second fluid port of the second hydraulic displacement unit; when the second pump valve is set to the second control position, the second pump valve fluidly connects the second fluid port of the hydraulic pump to the second fluid port of the first hydraulic displacement unit and fluidly disconnects the second fluid port of the hydraulic pump from the second fluid port of the second hydraulic displacement unit; and when the second pump valve is set to the third control position, the second pump valve fluidly connects the second fluid port of the hydraulic pump to the second fluid port of the second hydraulic displacement unit and fluidly disconnects the second fluid port of the hydraulic pump from the second fluid port of the first hydraulic displacement unit; the accumulator valve providing fluid communication between the accumulator assembly and the hydraulic displacement units and the accumulator valve having at least three control positions or control configurations, wherein the accumulator valve is configured such that: when the accumulator valve is set to the first position/configuration, the hydraulic accumulator assembly is fluidly disconnected from the hydraulic circuit; when the accumulator valve is set to the second position/configuration, the high pressure accumulator is selectively fluidly connected to the first fluid port of at least one of the first and the second hydraulic displacement unit, and the low pressure accumulator is fluidly connected to the corresponding second fluid port or fluid ports of the hydraulic displacement unit or units to which the high pressure accumulator is fluidly connected; and
 when the accumulator valve is set to the third position/configuration, the high pressure accumulator is selectively fluidly connected to the second fluid port of at least one of the first and the second hydraulic displacement unit and the low pressure accumulator is fluidly connected to the corresponding first fluid port or fluid ports of the hydraulic displacement unit or units to which the high pressure accumulator is fluidly connected;
 an output shaft;
 wherein the first hydraulic displacement unit is drivingly engaged or selectively drivingly engaged with the output shaft, and wherein the second hydraulic displacement unit is drivingly engaged or selectively drivingly engaged with the output shaft;
 wherein the control valves are configured to selectively:
 fluidly connect the hydraulic pump to the first hydraulic displacement unit while fluidly disconnecting the hydraulic pump from the second hydraulic displacement unit; and, simultaneously,
 fluidly connect the hydraulic accumulator assembly to the second hydraulic displacement unit while fluidly disconnecting the hydraulic accumulator assembly from first hydraulic displacement unit;
 wherein when the pump valve is set to the first position/configuration and the accumulator valve is set to the second position/configuration, the high pressure accumulator is fluidly connected to the first fluid ports of the first and the second hydraulic displacement unit and the low pressure accumulator is fluidly connected to the second fluid ports of the first and the second hydraulic displacement unit;
 wherein when the pump valve is set to the first position/configuration and the accumulator valve is set to the third position/configuration, the high pressure accumulator is fluidly connected to the second fluid ports of the first and the second hydraulic displacement unit and the low pressure accumulator is fluidly connected to the first fluid ports of the first and the second hydraulic displacement unit;

wherein when the pump valve is set to the second position/configuration and the accumulator valve is set to the second position/configuration, the high pressure accumulator is fluidly connected to the first fluid port of the second hydraulic displacement unit, the low pressure accumulator is fluidly connected to the second fluid port of the second hydraulic displacement unit, and the accumulator assembly is fluidly disconnected from the first hydraulic displacement unit;

wherein when the pump valve is set to the second position/configuration and the accumulator valve is set to the third position/configuration, the high pressure accumulator is fluidly connected to the second fluid port of the second hydraulic displacement unit, the low pressure accumulator is fluidly connected to the first fluid port of the second hydraulic displacement unit, and the accumulator assembly is fluidly disconnected from the first hydraulic displacement unit;

wherein when the pump valve is set to the third position/configuration and the accumulator valve is set to the second position/configuration, the high pressure accumulator is fluidly connected to the first fluid port of the first hydraulic displacement unit, the low pressure accumulator is fluidly connected to the second fluid port of the first hydraulic displacement unit, and the accumulator assembly is fluidly disconnected from the second hydraulic displacement unit; and wherein when the pump valve is set to the third position/configuration and the accumulator valve is set to the third position/configuration, the high pressure accumulator is fluidly connected to the second fluid port of the first hydraulic displacement unit, the low pressure accumulator is fluidly connected to the first fluid port of the first hydraulic displacement unit, and the accumulator assembly is fluidly disconnected from the second hydraulic displacement unit.

* * * * *